(12) United States Patent
Knorr et al.

(10) Patent No.: US 10,853,288 B2
(45) Date of Patent: Dec. 1, 2020

(54) BUS SYSTEM

(71) Applicant: WAGO Verwaltungsgesellschaft mbH, Minden (DE)

(72) Inventors: Ralf Knorr, Bad Salzuflen (DE); Christian Voss, Minden (DE); Horst Leber, Runkel (DE)

(73) Assignee: WAGO Verwaltungsgesellschaft mit beschraenkter Haftung, Minden (DE)

( * ) Notice: Subject to any disclaimer, the term of this patent is extended or adjusted under 35 U.S.C. 154(b) by 0 days.

(21) Appl. No.: 16/559,107

(22) Filed: Sep. 3, 2019

(65) Prior Publication Data
US 2020/0073838 A1 Mar. 5, 2020

(30) Foreign Application Priority Data

Sep. 3, 2018 (DE) .................. 10 2018 121 389

(51) Int. Cl.
*G06F 13/362* (2006.01)
*G06F 1/12* (2006.01)

(52) U.S. Cl.
CPC .............. *G06F 13/362* (2013.01); *G06F 1/12* (2013.01)

(58) Field of Classification Search
CPC .................................................. G06K 19/0723
See application file for complete search history.

(56) References Cited

U.S. PATENT DOCUMENTS 6,115,075 A * 9/2000 Yoneno .................... G09G 3/20
348/537

* cited by examiner

*Primary Examiner* — Henry Tsai
*Assistant Examiner* — Juanito Borromeo
(74) *Attorney, Agent, or Firm* — Muncy, Geissler, Olds & Lowe, P.C.

(57) ABSTRACT

A bus system having a plurality of bus components connected in a bus for the transmission of process data by all bus components, with a master as one of the bus components, with at least one slave as one of the bus components. The master has a master system clock for a master system time. The slave has a slave system clock for a slave system time to be synchronized with the master system time. The master is set up to send a synchronization command at a synchronization time via the bus for the parallel reception by the bus components embodied as slaves. The slave system clock of the slave is set up to calculate and output the slave system time based on the synchronization time received by the data transmission and the synchronization signal time and the current time value of the monotone clock.

13 Claims, 3 Drawing Sheets

BUS SYSTEM

This nonprovisional application claims priority under 35 U.S.C. § 119(a) to German Patent Application No. DE 10 2018 121 389.1, which was filed in Germany on Sep. 3, 2018, and which is herein incorporated by reference.

BACKGROUND OF THE INVENTION

Field of the Invention

The present invention relates to a bus system with a plurality of bus components.

Description of the Background Art

From EP 1 368 728 B1, which corresponds to U.S. Pat. No. 7,012,980, a synchronous, clocked communication system with a relative time clock is known. The data exchange takes place in equidistant communication cycles, which are specified by the communication clock used by the system. The duration of a communication clock cycle is between 10 µs and 10 ms. Synchronizing the components to the communication clock used is done by using the so-called global control data packet, which in each case instantly indicates the beginning of the next communication cycle, thus sending to all components in a timely manner. In order to ensure the clock-synchronous data exchange, the components are continuously resynchronized during operation. All components are connected via data lines to a data network, such as Ethernet, Industrial Ethernet, Fieldbus, Profibus, FireWire or even PC-internal bus systems (PCI, etc.), but also clocked data networks, such as Isochronous Realtime Ethernet. The data lines are developed in such a way that they can transmit or guide signals as well as other electronic impulses. The communication system must first settle, so that in the steady state all components, for example, decentralized input/output modules, are synchronized both to the communication clock of the data network as well as to the system-wide relative time clock and thus to the relative time.

In this case, a reference clock is generally used to cyclically determine a local error, which is then to be eliminated with a suitable controller. For this purpose, the controller can adjust the speed of the local clock to be synchronized as a manipulated variable in order to regulate the local error to zero. The reference clock is usually realized by the event of receiving a particular communication message. The message often also contains the target value for the time required to calculate the local error. For synchronization, a PI controller is generally used, which changes the speed of the local clock such that the local clock runs as fast as the higher-level clock, so the error of accuracy or drift error is regulated to zero. Furthermore, the PI controller changes the speed of the local clock such that the local clock provides the same time as the higher-level clock.

Accordingly, the offset error is regulated to zero.

From DE 10 2012 108 696 A1, which corresponds to U.S. Pat. No. 9,436,212, which is incorporated herein by reference, a data bus component for receiving data via a data bus interface is known. The data bus component has a clock generator for generating an internal clock signal for the data bus component. The data bus component has a synchronization unit for synchronizing the clock generator to the clock signal of a higher-level data bus component. The synchronization unit is set up to detect transitions in the downstream data stream received at the downstream data bus input and to regulate the frequency of the internal clock signal as a function of the detected transitions, and to set a defined phase position of the internal clock signal to the detected transitions.

SUMMARY OF THE INVENTION

It is therefore an object of the present invention to provide an improved automation system wherever possible.

In an exemplary embodiment, a bus system is provided with a plurality of bus components. The bus system can be used, for example, to control a process by means of process data. The bus components of the bus system are connected in an order in a bus for purposes of ring-shaped transmission, wherein the bus is serially formed by all bus components in the order for purposes of transmitting process data. A bus for ring-shaped transmission may also be referred to as a ring bus. In this case, the process data is transmitted by all bus components in the ring. In the ring-shaped transmission, each bus component can, for example, read the process data intended for it or write its own process data for transmission, for example, to the area of a data packet intended for it. The components are preferably arranged in a fixed order, so that the transmission in the unchanged bus system always passes through the bus components in the same order.

The bus system has a master, which can be embodied as one of the bus components. The master has a master system clock for a master system time.

The bus system has at least one slave, which can be embodied as one of the bus components. The slave has a slave system clock for a slave system time to be synchronized with the master system time. The bus system can also have a plurality of additional slaves as bus components. Each slave of this plurality synchronizes its slave system time to the master system time. Accordingly, this plurality of slaves is preferably assigned to exactly one master with the master system time.

The slave has a shift register which is connected in series with the bus components for purposes of transmitting the process data via the bus. Accordingly, the shift register receives the process data from a preceding bus component. The process data is shifted into the shift register based on a clock. Also based on the clock, the process data is pushed out from the shift register to a subsequent bus component, so that the bus component preceding in the order is connected in series, i.e. serially, with the shift register and the subsequent bus component. Advantageously, the previous bus component and the subsequent bus component also have further shift registers for the series connection.

For example, the master also has a shift register. Prior to each shift cycle, the master copies the process output data to its shift register. The slaves copy the process input data to their shift register prior to each shift cycle. After the shift cycle, the shift register contains the process input data of all slaves in the master, and the shift registers in the slaves contain their respective process output data. During the shift cycle, the process data is not changed. In an alternative bus system, the slave has the option of changing the process data contained in the shift register or advancing it as-is.

The slave has a command circuit and a switching device. The command circuit is set up to receive at least one synchronization command. Preferably, the command circuit is also configured to receive an additional, or a plurality of additional, different commands. A command can also be called an instruction.

The switching device is connected to receive the synchronization command such that the bus components embodied as slaves are connected in parallel for receiving the synchronization command. Contrary to the series connection for the process data, which are received by the bus components one after the other, i.e., with a time delay, the synchronization command is not received with a time delay. The command circuits of the bus components receiving the synchronization command are connected in parallel by the switching device for simultaneous reception, i.e., they receive the synchronization command at the same time.

The master is set up to send the synchronization command at a synchronization time for parallel reception by the bus components embodied as slaves. The master is set up to determine the synchronization time. If the master sends the synchronization command, the master can calculate the synchronization time, for example in multiprocessor systems (MCPU & SCPU). According to an advantageous development of the invention, the master is set up to read out the synchronization time from the master system clock.

The command circuit of the slave is set up to output an interrupt signal to the slave system clock upon receipt of the synchronization command. The interrupt signal is also referred to as the interrupt request IRQ signal. Accordingly, the slave system clock is set up to receive the interrupt signal.

The slave system clock of the slave has a monotone clock. The slave system clock is set up to store the time value of the monotone clock at the time of outputting the interrupt signal as the synchronization signal time. Here, the synchronization signal time is usually significantly different from the synchronization time.

The master is set up to send the determined synchronization time to the bus by means of a data transmission. The determined synchronization time can be transmitted as a binary value, for example.

The slave is set up to receive the data transmission for the synchronization time by means of the shift register. The shift register is connected in series with the bus components via the bus for the purpose of sending the data transmission. If the bus components embodied as slaves cannot read out one and the same transmitted data range from the shift registers, the synchronization time and the start of the synchronization service are transmitted separately to each slave, for example. The separate transmission can be omitted if each bus component can read out the synchronization time and the start of the service from the same data range. The synchronization time and the start of the service are transmitted by the bus components in the series.

The slave system clock of the slave is configured to calculate and output the slave system time based on the synchronization time received by the data transmission and the synchronization signal time and the current time value of the monotone clock. Preferably, the system time is calculated in the slave from a plurality of synchronization times and a plurality of synchronization signal times and the current monotone time. For example, the calculation can be made using the formula:

$$SST=(\overline{m}*(t_M-t_S))+(t_R-t_{Korr}) \qquad (1)$$

In this case, SST is the system time, m the mean time difference $\Delta t_R/\Delta t_S$, $t_M$ the monotone time, $t_S$ the synchronization signal time, $t_R$ the synchronization time and $t_{Korr}$ the correction time.

Advantageously, the slave system clock operates in a three-step process. During synchronization, two correction values, factor and offset, are calculated. The slave system clock is set up to calculate the system time with these values from the monotone time on a request. The equation (1) can be simplified in $$SST=\text{factor}*t_M+\text{offset} \qquad (2).$$

Thus, the bus system can be significantly improved by the aforementioned features, in particular, the clock synchronization can be improved with little hardware modification.

According to an advantageous development, the slave can be connected to a data line of the bus. A data line of the bus is preferably embodied as an electrical line for the transmission of data. To connect the slave to the data line, an electrical contact or electrical branch or tap is provided in the simplest case. Preferably, the command circuit of the slave is connectable to and disconnectable from the data line via the switching device. By means of the switching device, commands transmitted via the data line are passed to the command circuit. On the other hand, process data is not read in by the command circuit. According to an advantageous development, the data line of the bus is connected to each bus component for the parallel reception of the synchronization command by the bus components embodied as slaves.

The command circuit can have a register for the at least temporary storage of the synchronization command. The register is advantageously set up in particular for the serial input of the synchronization command via the data line. Advantageously, the register is set up to receive, in addition to the synchronization command, a number of further commands that differ from the synchronization command.

The switching device can be connected to the register or to the shift register. Advantageously, the switching device is connected to a data input of the shift register or to a data input of the register.

The master can have a wired and/or wireless connection to a time server and/or a time signal generator. Advantageously, the time server and/or the time signal generator can be formed inside or outside the bus system. Accordingly, in addition to the ring-shaped bus, the master has another separate data connection in order to connect to the time server and/or the time signal generator.

The switching device can have a semiconductor switch, a gate or other logic element for switching. Another logic element is, for example, an addressing logic, wherein the shift register and/or the register are formed in a RAM. In this case, the addressing logic is set up to write the process data and the command to different address areas in the RAM for the reception.

The command circuit can have an evaluation circuit. The evaluation circuit can be set up to determine a number of different commands. For the determination, the evaluation circuit is configured, for example, to compare bits received as a command to a number of table entries in a table—(LUT—Look Up Table) and to output an output value from the table. Advantageously, the evaluation circuit is configured to output the interrupt signal when the synchronization command is determined by the evaluation circuit.

The evaluation circuit can have a digital logic for purposes of the determination. Preferably, the logic is hardware and not software. For example, the logic is embodied by a gate logic. The evaluation circuit preferably has an output connected to the digital logic for outputting the interrupt signal.

The bus can have a control line. The control line differs from the data line. Preferably, the control line has exactly one electrical line, so that control signals can be transmitted via the exactly one electrical line of the control line. Preferably, the slave is arranged to receive the synchronization command based on a control signal on the control line. Preferably, the control line is connected to the bus components.

The slave can have a microcontroller. Advantageously, the slave system clock is part of the microcontroller. The microcontroller has a pause capable input for input of the output interrupt signal. A pause capable input is also called an interrupt input (IRQ—interrupt request). The interrupt signal at the pause capable input of the microcontroller advantageously acts directly on the slave system clock implemented in the microcontroller.

The slave can be set up to receive a first synchronization command and a second synchronization command. Preferably, the second synchronization command follows the first synchronization command. Advantageously, the slave is set up to at least partially compensate for a drift error of the slave system clock relative to the master system clock based on a time difference between receipt of the first synchronization command and receipt of the second synchronization command. The drift error can also be referred to as an accuracy error, drift deviation or speed error of the slave system clock. Due to the compensation, the master system clock and the slave system clock diverge less quickly.

The time synchronization can take place in a multiprocessor system and/or in a single-processor system.

Another aspect of the invention is a method of synchronization. Accordingly, a method is provided for synchronizing a slave system time to a master system time in a bus system having a plurality of components. The bus system may be suitable, for example, for controlling a process by means of process data. Bus components of the bus system are connected in an order in a bus for ring-shaped transmission. A master, embodied as one of the bus components, has a master system clock for the master system time. At least one slave, embodied as one of the bus components, has a slave system clock for the slave system time.

In the method, a number of method steps are performed. The method steps explained below can be carried out in different step sequences. Thus, the described method steps can be interchanged.

Transmission of the process data serially by all bus components in the order in the bus, wherein a shift register of the slave is connected in series with the bus components via the bus for the transmission of the process data;

Receipt of at least one synchronization command by a command circuit of the slave;

Switching of a switching device of the slave to receive the synchronization command such that the slaves embodied as bus components are connected in parallel for the reception of the synchronization command;

Sending of the synchronization command for the parallel reception by the bus components embodied as slaves via the bus at a synchronization time by the master;

Outputting of an interrupt signal to the slave system clock upon receipt of the synchronization command by the command circuit of the slave;

Recording of the time value of a monotone clock of the slave system clock at the time of the outputting the interrupt signal as the synchronization signal time by the slave system clock of the slave;

Determination of the synchronization time by the master;

Sending of the determined synchronization time by means of a data transmission to the bus by the master;

Receipt of the data transmission by means of the shift register by the slave, wherein the shift register is connected in series with the bus components for the transmission of the data transmission via the bus;

Calculation of the slave system time by the slave system clock based on the synchronization time received by means of the data transmission and the synchronization signal time and the current time value of the monotone clock; and Outputting of the slave system time by the slave system clock.

The steps of the method can take place in a predetermined order. There may be steps in the process in addition to those mentioned above.

Another aspect of the invention are different operating modes of clock synchronization.

The synchronization is advantageously adapted to the bus system. The embodiments and further developments described above offer several operating modes for clock synchronization.

Clock synchronization can take place cyclically in a first operating mode. The cyclic clock synchronization preferably takes place with a high cycle time, for example once per second. Advantageously, the cycle time is a multiple of the cycle time of the bus system.

In a second operating mode, the clock synchronization can take place, in particular, internally event-driven, in particular on request by one or more of the slaves.

In a third mode the clock synchronization can take place in a mixed operation, i.e., cyclically and externally event-driven, for example, after aligning the master system clock with a time server.

These operating modes enable time synchronization in a system with or without a fixed cycle time, i.e., soft or hard real time. In this case, for example, the operating mode of the bus system or the cycle time is unknown to the slaves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
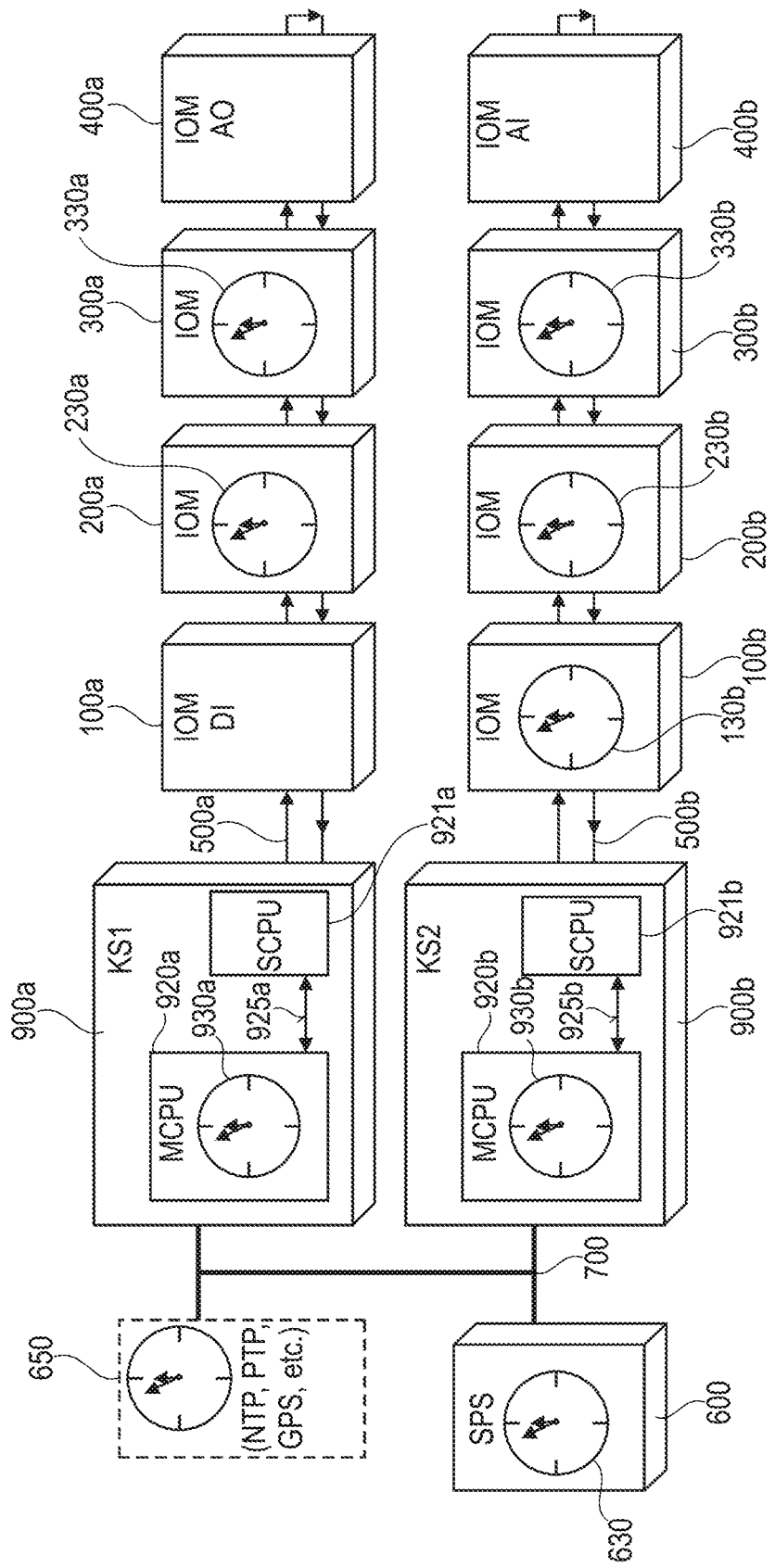
FIG. 1 shows a schematic block diagram of an exemplary embodiment of a bus system.

FIG. 1 shows a schematic embodiment of a bus system as a block diagram. The bus system is used, for example, to control a process by means of process data. Shown in FIG. 1 are a communication master 900*a* embodied as a head station KS1, which is connected via a bus 500*a* to a number of slaves 100*a*, 200*a*, 300*a*, 400*a* embodied as input-output modules (I/O modules) for purposes of ring-shaped transmission. In FIG. 1, another communication master 900*b* embodied as a head station KS2 is connected for ring-shaped transmission via a further bus 500*b* to a number of slaves 100*b*, 200*b*, 300*b*, 400*b* embodied as input-output modules.

The input-output modules 100*a*, 200*a*, 300*a*, 400*a*, 100*b*, 200*b*, 300*b*, 400*b* can be connected to external devices, e.g., sensors or actuators. Studies by the Applicant have shown that in different applications, for example a level change at an input of an input-output module (IOM) 200*a*, an accurate time of occurrence is to be detected. Frequently, the input-output module 200*a* has its own non-synchronized time, which is not accurate enough to detect the exact time of the level change.

The central system time in a master 900*a* may be referred to as the master system time. In the embodiment of FIG. 1, the master system time is kept in sync with a central NTP or PTP time server 650 by the master 900*a*. In order to preserve the link of the slave system clock 230*a* of a slave 200*a* to the master system time, a slave system time of the slave system clock 230*a* is synchronized and kept in sync. In the embodiment of FIG. 1, the master 900*a* is also the communication master, which masters and controls communication to the communication slaves 100*a*, 200*a*, 300*a*, 400*a*. In this case, since the slave 200*a* is driven by the master 900*a* and the slave 200*a* does not have direct access to the central time server 650, synchronization of the slave system clock 230*a* via the master 900*a* is advantageous.

In the embodiment of FIG. 1, both masters 900*a*, 900*b* independently synchronize their master system clocks 930*a*, 930*b* with the NTP or PTP server 650. The master 900*a*, 900*b* has a main processor 920*a*, 920*b* and a slave processor 921*a*, 921*b*. Both processors 920*a*, 920*b*, 921*a*, 921*b* are connected within each master 900*a*, 900*b* via an interface 925*a*, 925*b*, for example an SPI interface or another interface. For example, a DP-RAM (DP—Dual Port) could also be used. Data which is to be sent from a main processor 920*a*, 920*b* with the master system clock 930*a*, 930*b* via the ring bus 500*a*, 500*b* to the slaves 100*a*, 200*a*, 300*a*, 400*a*, 100*b*, 200*b*, 300*b*, 400*b* operated in the respective node is sent from the main processor 920*a*, 920*b* via the interface 925*a*, 925*b* first to the slave processor 921*a*, 921*b* and then from there via the ring bus 500*a*, 500*b* to the slaves 100*a*, 200*a*, 300*a*, 400*a*, 100*b*, 200*b*, 300*b*, 400*b* embodied as input-output modules (IOM). On bus 500*a*, 500*b*, slaves 200*a*, 300*a*, 100*b*, 200*b*, 300*b* with a synchronizable slave system clock 230*a*, 330*a*, 130*b*, 230*b*, 330*b* as well as slaves 100*a*, 400*a*, 400*b* without a synchronizable clock can be operated.

In the exemplary embodiment of FIG. 1, a local bus 500*a* and a further local bus 500*b* are shown, wherein the respective bus components, i.e., the master 900*a*, 900*b* and the slaves 100*a*, 200*a*, 300*a*, 400*a*, 100*b*, 200*b*, 300*b*, 400*b*, are connected during operation in a fixed order in the bus 500*a*, 500*b* for a ring-shaped transmission. By means of the bus 500*a*, 500*b*, process data can be transmitted serially by all bus components 900*a*, 100*a*, 200*a*, 300*a*, 400*a*, in the order of the bus 500*a*, or by all bus components 900*b*, 100*b*, 200*b*, 300*b*, 400*b* in the order of the further bus 500*b*. In the exemplary embodiment of FIG. 1, the master 900*a* and each slave 100*a*, 200*a*, 300*a*, 400*a* of the bus 500*a* have a shift register for serial transmission, wherein the shift registers of the master 900*a* and the slaves 100*a*, 200*a*, 300*a*, 400*a* are connected in series for transmitting the process data via the bus 500*a*. Thus, all the shift registers of the slaves are connected in series via the bus 500*a* to the shift register in the master 900*a* in the ring for transmitting the process data.

After the start of the automation system, the master system clock 930*a* and the slave system clocks 230*a*, 330*a* are not in sync with each other. In the exemplary embodiment of FIG. 1, a synchronization signal which acts simultaneously in the bus components 900*a*, 200*a*, 300*a* is provided. The synchronization signal can be designed, for example, as a command and is also referred to below as a synchronization command. The time at which the synchronization signal was generated by the master 900*a* is recorded in the master 900*a* by storing a time stamp, also referred to as synchronization time. Since the master system clock 930*a* is synchronized with the central time server 650 in the master 900*a*, there is a temporal relationship of the synchronization time to the clock of the central time server 650. The slaves 200*a*, 300*a* are set up to record the time when the synchronization signal was received, a timestamp of their own slave monotone clock as a synchronization signal time. However, the master system clock 930*a* and the slave system clocks 200*a*, 300*a* of the bus 500*a* are not yet synchronized with the storage of the timestamps. So that the slave system clocks 200*a*, 300*a* are synchronized with the master system clock 930, in the exemplary embodiment of FIG. 1, the slaves 200*a*, 300*a* are informed of the synchronization time of the master 900*a*. In this case, in the exemplary embodiment of FIG. 1, the synchronization time is transmitted to the bus 500*a* by the master 900*a* by means of a data transmission. Each of the slaves 200*a*, 300*a* to be synchronized receive the data transmission by means of its shift register. The shift registers of the bus components 100*a*, 200*a*, 300*a*, 400*a*, 900*a* are connected in series via the bus 500*a* to transmit the data transmission of the synchronization time.

After the synchronization time has been transmitted to the slaves 200*a*, 300*a*, the slaves 200*a*, 300*a* are aware both of their own synchronization signal time and the synchronization time of the master 900*a*. Although the system clocks 930*a*, 230*a*, 330*a* have continued to operate in the master 900*a* and in the slaves 200*a*, 300*a* since the occurrence of the synchronization signal, the slaves 200*a*, 300*a* can calculate a number of values for temporal synchronization of their slave system clocks 230*a*, 330*a* based on the synchronization time transmitted via the bus 500*a* by the master 900*a* and the synchronization signal time. Such values are for example an offset or a factor, e.g., according to equation (2), wherein the factor can be calculated by means of a plurality of synchronization times. With the correct calculation, the slave system clocks 230*a*, 330*a* are synchronized with the master system clock 930*a*, wherein a residual synchronization error is inherent.

If the system clocks are synchronized in the exemplary embodiment of FIG. 1, it is possible to precisely detect the time of an event at an input of a slave 200*a*
and forward it to the central control device 600 via a field bus 700.

In the embodiment of FIG. 1, three operating modes for data exchange via the bus 500*a* may be provided. The data exchange via the bus 500*a* enables soft real-time. In the exemplary embodiment of FIG. 1, masters 900*a*, 900*b* are shown with a multiprocessor system, wherein the SCPU 921*a*, 921*b* in the multiprocessor system does not have to include a clock. The synchronization process is adjusted as a function of the hardware of the master 900*a*, 900*b*. The embodiment of FIG. 1 allows for several operating modes for clock synchronization, namely: Cyclic with high cycle time, e.g., once per second; Event-driven on request by at least one of the slaves 200*a*, 300*a*, 100*b*, 200*b*, 300*b*; Mixed operation, cyclic and event-driven, e.g., after alignment of the master system clock 920*a*, 920*b* with a time server 650; Time synchronization in a system with or without a fixed cycle time, or soft or hard real-time, wherein the operating mode of the bus 500*a*, 500*b* or the cycle time of the slaves is not known, for example; or Time synchronization in a multiprocessor system as in the embodiment of FIG. 1 and/or in a single processor system.

Figure 2:
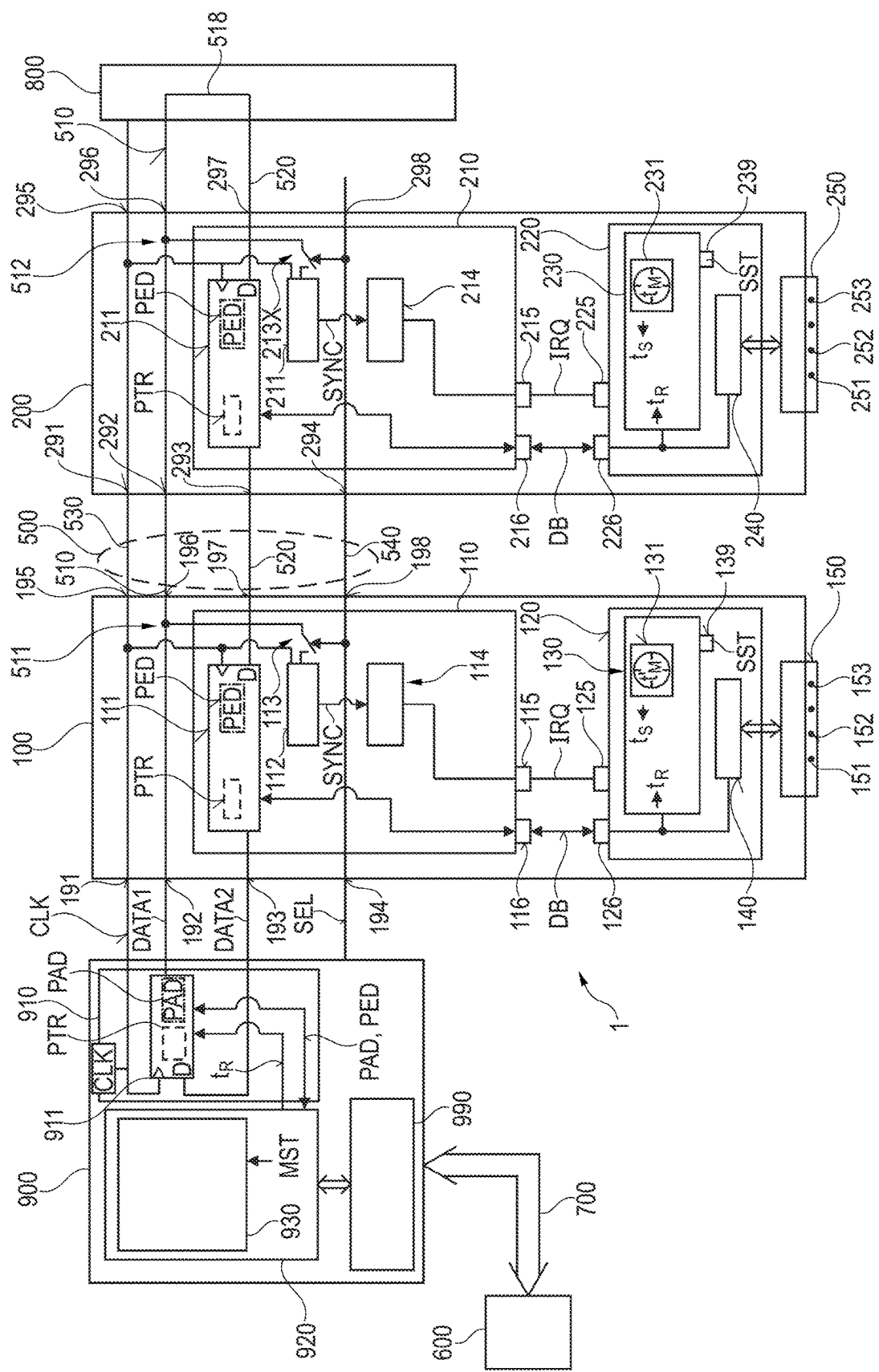
FIG. 2 shows a schematic block diagram of an exemplary embodiment of a bus system.

FIG. 2 shows a further exemplary embodiment of a bus system 1 with a master 900 and a first slave 100 and a second slave 200. The bus system 1 is designed and set up to control a process by means of process data, for example with process output data PAD and process input data PED. In the exemplary embodiment of FIG. 2, the bus system 1 has, by way of example, three bus components 100, 200, 900 which are connected in an order in a bus 500 for ring-shaped transmission. The bus 500 is designed to transmit the process data PAD, PED serially by all bus components 100, 200, 900 in the order.

The master 900 is embodied as one of the bus components. The master 900 has a shift register 911 of variable length for serial transmission via the bus 500. A serial output of the shift register 911 is connected to a data line 510 of the bus 500 for outputting data DATA1. The data input D of the shift register 911 is connected to another data line 520 of the bus 500 for the serial reception of data DATA2. The shift register 911 of the master 900 is part of a transmit-receive-circuit (transceiver) 910 of the master 900. The transceiver 910 is connected to at least one processor 920 of the master 900. It is schematically illustrated in the embodiment of FIG. 2 that process output data PAD can be loaded from the processor 920 to the shift register 911.

A first slave 100 and a second slave 200 are embodied as bus components. With a clock signal CLK on a clock line 530 of the bus 500, the process output data PAD is shifted from the shift register 911 of the master 900 through shift registers 111, 211 of the slaves 100, 200. At the same time, process input data PED from the shift registers 111, 211 of the slaves 100, 200 is shifted into the shift register 911 of the master 900. Each slave 100, 200 has a shift register 111, 211 which is connected in series with the bus components 100, 200, 900 in order to transmit the process data PAD, PED via the bus 500. In the exemplary embodiment of FIG. 2, the bus system 1 has an end cap 800, the end cap 800 having a line 518 for connecting the data line 510 to the further data line 520.

The master 900 has a master system clock 930 for a master system time MST. In the exemplary embodiment of FIG. 2, the master system clock 930 is implemented in a computing unit 920 of the master 900. The computing unit 920 is designed, for example, as a microcontroller or processor. In the exemplary embodiment of FIG. 2, the master 900 is designed to synchronize the master system clock 930 with the clock of an external control device 600 via a higher-level bus 700, for example a field bus 700, for example EtherCAT or Profinet.

The slave 100 has a slave system clock 130 for a slave system time SST to be synchronized with the master system time MST. The slave system time SST is determined, for example, as an absolute time value or as a relative time value. By means of the slave system time SST, for example, the most accurate timing of an event on the slave 100 is provided. For example, an input of an input signal at an input terminal 151, 152, 153 of an external interface 150 of the slave 100 or at an input terminal 251, 252, 253 of an external interface 250 of the slave 200 can be captured precisely in time.

The slaves 100, 200 require a synchronization signal SYNC, which is directed in the embodiment of FIG. 2 by the master 900 as a head-end station to the slaves 100, 200 as I/O modules. In order to transmit the synchronization signal SYNC, the local bus 500 is used. In the exemplary embodiment of FIG. 2, a synchronization command SYNC is transmitted as the synchronization signal SYNC. Of course, it is also possible to use other commands that can be transmitted via the local bus 500 as synchronization commands SYNC. Such commands are generally already used and fulfill, for example, another task/purpose in the system, wherein the simultaneous use as command and synchronization command SYNC is compatible with a transmission of the synchronization signal.

The first slave 100 has a command circuit 112, 114 and a switching device 113. Likewise, the second slave 200 has a command circuit 212, 214 and a switching device 213. The switching device 113, 213 has, for example, a semiconductor switch, a gate or other logic element for switching. The command circuit 112, 114 is set up to receive at least one synchronization command SYNC. This makes it possible for the synchronization command SYNC to be received simultaneously by the slaves 100, 200 connected to the bus 500.

In the exemplary embodiment of FIG. 2, the command circuit has a register 112 for at least temporary storage of the synchronization command SYNC. The register 112 is formed in the embodiment as a further shift register. A length of the register 112 is adapted to a bit length of commands to be received. One of these receivable commands is the sync command SYNC. However, register 112 in the embodiment of FIG. 2 is configured to receive any other types of commands.

A data input D of the command circuit register 112 is connected via the switching device 113 to the first data line 510 of the bus 500 in order to receive the bits associated with the synchronization command SYNC via the first data line 510 of the bus 500. The bits of the synchronization command SYNC are evaluated by the evaluation circuit 114. In the embodiment of FIG. 2, the switching device 113 is connected to the register 112. As shown, the switching device 113 is connected to an input, here a data input D. Alternatively, the switching device can be connected to a selected input (select input) or to a clock input of the register 113, so that data is written to the register only when enabled.

In the exemplary embodiment of FIG. 2, the command circuit has an evaluation circuit 114. The evaluation circuit 114 is set up to determine a number of different commands. In this case, the evaluation circuit 114 is set up to determine at least the synchronization command SYNC. The evaluation circuit 114 is set up to output the interrupt signal IRQ when the synchronization command SYNC can be determined by the evaluation circuit 114. The synchronization command SYNC has, for example, a data word whose value is assigned to the synchronization. For the determination, the evaluation circuit 114 is advantageously embodied as a digital logic. An output 115 of the digital logic is configured to output the interrupt signal IRQ. To allow for low latency, the digital logic is preferably hardwired and, for example, not clocked. For example, the logic consists of gate elements.

So that in the embodiment of FIG. 2, the synchronization command SYNC can be received by the command circuit 112, 114, the switching device 113 connects an input of the register 112 to the data line 510. Preferably, therefore, the slave 100 is connected to the data line 510 of the bus 500. The command circuit 112, 114 of the slave 100 can be advantageously connected to and disconnected from the data line 510 via the switching device 113.

For this purpose, the switching device 113 is controlled by a control signal SEL on a control line 540 for establishing the connection. The same applies to the second slave 200. In this case, the switching device 213 connects an input of the register 212 to the data line 510. For this purpose, the switching device 213 is controlled by the control signal SEL on the control line 540 for establishing the connection. In this case, all slaves 100, 200 are simultaneously controlled by the control signal SEL on the control line 540.

Advantageously, the bus 500 has the control line 540. The slave 100 is advantageously set up to receive the synchronization command SYNC on the data line 510, based on the control signal SEL on the control line 540. The control line 540 is, as shown in FIG. 2, connected to the slaves 100, 200 and embodied as bus components and to the master 900 embodied as a bus component. The master 900 is connected via the control line 540 to control the switching states of the switching devices 113, 213 and designed for this purpose for outputting the control signal SEL on the control line 540. Accordingly, all inputs of the registers 112, 212 of the slaves 100, 200 are simultaneously connected in parallel to the same data line 510 for receiving the synchronization command SYNC. The switching device 113 is connected to receive the synchronization command SYNC such that the registers 112, 212 of the slaves 100, 200 are connected in parallel for receiving the synchronization command SYNC. The synchronization command SYNC captured in the transceiver 110 triggers a state change at an output port 115. The transceiver 110 is arranged, for example, in an application-specific circuit (ASIC).

In the exemplary embodiment of FIG. 2, the slave 100 has a microcontroller 120. The slave system clock 130 is in this case a component of the microcontroller 120. The slave system clock 130 is designed, for example, as a software program part or as a separate hardware part of the microcontroller 120. The microcontroller 120 has a pause capable input 125 for inputting the output interrupt signal IRQ. The output terminal 115 is connected to an interrupt-capable input 125 of the microcontroller 120, wherein the slave system clock 130 is implemented in the microcontroller 120. Furthermore, the second slave 200 has a further microcontroller 220. In each case, the slave system clock 130, 230 is part of the microcontroller 120, 220. The microcontroller 120, 220 itself has the pause capable input 125, 225 for inputting the output interrupt signal IRQ.

By triggering the interrupt on the interrupt-capable input 125 (IRQ pin), the firmware of the slave 100 enters an interrupt service routine ISR and executes the processes required for the synchronization. Alternatively, it is possible to use a corresponding appropriately configurable contact on a CPU or microcontroller, a so-called GPIO (General Purpose Input Output) or IRQ pin on the microcontroller, wherein this pin is polled and not evaluated in an ISR. In this case, the synchronization signal time tS is detected by the hardware so that the method does not lose precision.

The completion of the transmission of the sync command SYNC via the bus 500 is known to the master 900 as the controlling component.

For example, the master knows the number of clocks with which it transmits the SYNC command into the slaves 100, 200. With the last clock of the transmission, the SYNC command and thus the IRQ becomes active. The terminals also return a temporal acknowledgment of the commands to the master 900. The acknowledgment takes place with the termination of the IRQ routines in the slaves 100, 200.

In particular, the master 900 is aware of the delays in transmission. The Applicant's studies have shown that the master 900 can calculate the timing of the output of the interrupt signal IRQ with high accuracy. The timing of the output of the interrupt signal IRQ differs only with a very small error from the synchronization time $t_R$ calculated in the master 900. In this case, the latencies involved in processing the synchronization steps on the master 900 and the duration incurred for the transmission of the synchronization command SYNC on the bus 500 are taken into account as the total delay time. A time stamp of the master system clock 930 and the total delay together form the comparison time determined as the synchronization time $t_R$.

In the embodiment of FIG. 2, the first slave 100 has a number of contacts 191, 192, 193, 194, 195, 196, 197, 198 and the second slave 200 has a number of contacts 291, 292, 293, 294, 295, 296, 297, 298. The contacts 191, 192, 193, 194, 195, 196, 197, 198, 291, 292, 293, 294, 295, 296, 297, 298 serve to connect the respective slave 100, 200 to lines 510, 520, 530, 540 of the bus 500. Differently than shown in FIG. 2, the bus components 100, 200, 900 can also adjoin one another directly and are electrically connected directly to each other by the contacts 192, 193, 194, 195, 196, 197, 198, 291, 292, 293, 294, 295, 296, 297, 298.

For the parallel reception of the synchronization command SYNC by the slaves 100, 200 as bus components, the data line 510 of the bus 500 is advantageously connected to each bus component 100, 200, 900. The first slave has the contact 192 as input terminal and the contact 196 as output terminal for the data line 510, wherein the contacts 192, 196 are connected within the first slave 100 via a conductor, so that data DATA1 is looped through the housing.

For parallel connection, the first slave 100 has a node 511, via which the data line 510 is electrically connected to the switching device 113. Accordingly, the second slave 200 has a node 512, via which the data line 510 is electrically connected to the switching device 213. Via the contacts 192, 196, 292, 296, the data line 510 passes through all bus components 100, 200, 900 of the bus system 1 connected to the bus 500. Alternatively, the taps 511, 512 could be formed outside the housing of each slave 100, 200.

In the exemplary embodiment of FIG. 2, the master 900 is set up as one of the bus components to transmit the synchronization command SYNC for the parallel reception by the slaves 100, 200 via the bus 500 at a synchronization time $t_R$. For this purpose, the master 900 outputs the control signal SEL on the control line 540 of the bus 500 and sends the synchronization command SYNC in parallel to the slaves 100, 200 via the data line 510. In the embodiment of FIG. 2, the master 900 itself determines the synchronization time $t_R$ in that, at the time of output of the synchronization command SYNC, a current value of the master system time MST of the master system clock 930 is detected and, taking into account delay times of the synchronization time $t_R$, is calculated by the computing unit 920 of the master 900. Alternatively, the calculation of the synchronization time $t_R$ can also be performed by a separate hardware circuit of the master 900.

In the exemplary embodiment of FIG. 2, the command circuit 112, 114 of the slave 100 is set up to output an interrupt signal IRQ to the slave system clock 130 when the synchronization command SYNC is received. The same is done in accordance with the second slave 200 in that the command circuit 212, 214 is set up to output an interrupt signal IRQ to the slave system clock 230 upon receipt of the synchronization command SYNC.

The slave system clock 130 of the slave 100 has a monotone clock 131 in the embodiment of FIG. 2. The slave system clock 130 is configured to record the time value $t_M$ of the monotone clock 131 at the time of outputting the interrupt signal IRQ as the synchronization signal time $t_S$. The quantities are shown schematically in FIG. 2 in the first slave 100 and, correspondingly for the slave system clock 230 with the monotone clock 231, in the second slave 200. A more detailed schematic of the slave system clock 130 is shown in FIG. 3.

In the exemplary embodiment of FIG. 2, the master 900 is set up to transmit the captured synchronization time $t_R$ to the bus 500 by means of a data transmission PTR. In this case, the data transmission PTR in turn takes place via the data line 510. The data transmission PTR is done, for example, by means of a process image, register communication, parameter channel or the like. For example, the data transmission is implemented by means of data packets, wherein the data packet contains the synchronization time $t_R$ as a digital value. Each slave 100, 200 is set up to receive the data transmission PTR by means of its shift register 111, 211. The shift registers 111, 211 of the slaves 100, 200 are connected in series via the bus 500 in order to send the data transmission PTR.

The slave system clock 130, 230 of each slave 100, 200 is configured to calculate the slave system time SST based on the synchronization time $t_R$ received by means of the data transmission PTR and the synchronization signal time $t_S$ and the current time value $t_M$ of each monotone clock 131, 231. and to output it at the output 139, 239.

Figure 3:
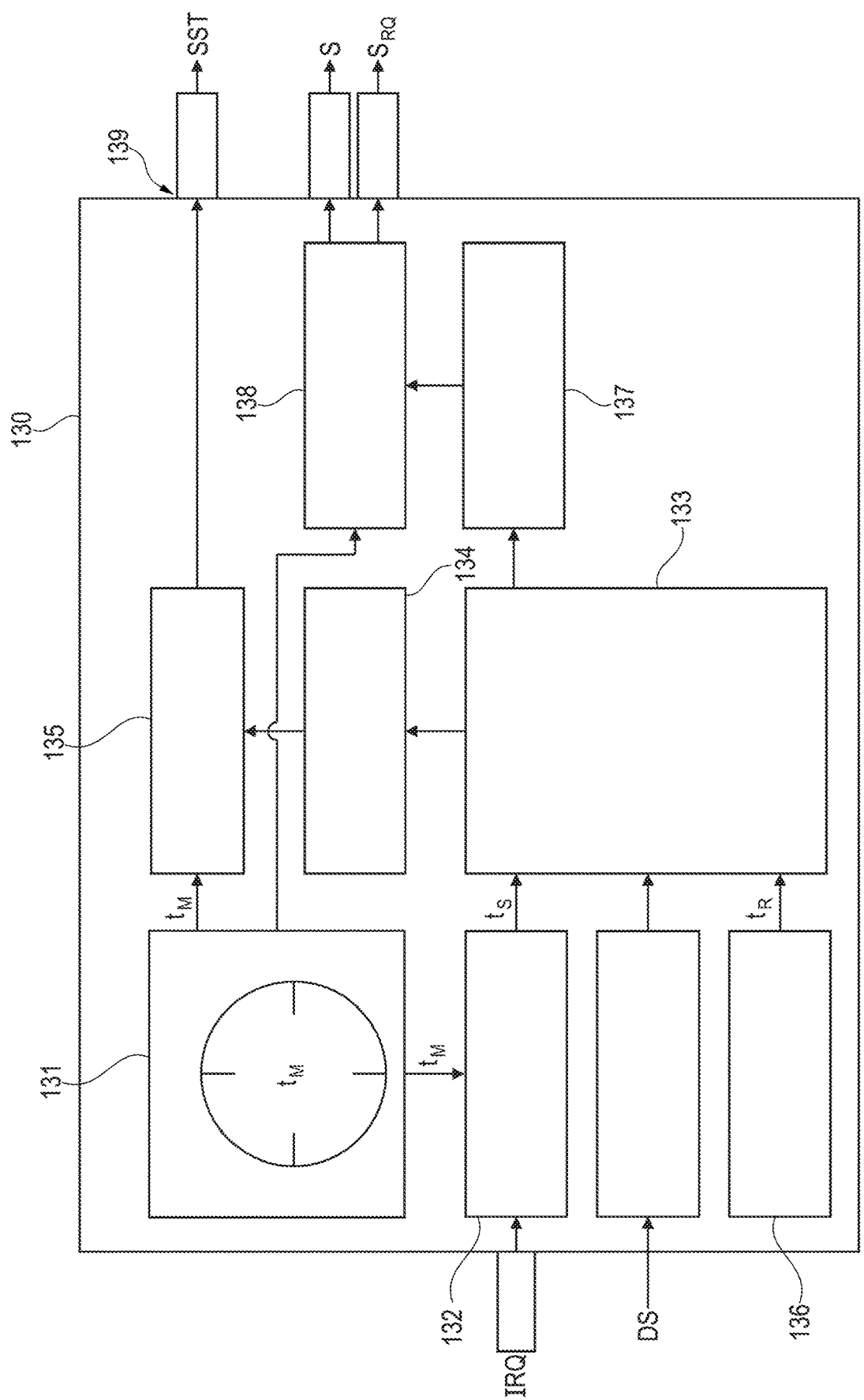
FIG. 3 shows a schematic block diagram of an exemplary embodiment of a slave system clock in a bus system.

FIG. 3 schematically shows an exemplary embodiment of a slave system clock 130 with function blocks. In this case, the slave system clock 130 may be embodied as a software program code and/or by hardware.

In the embodiment of FIG. 3, the slave system clock 130 operates in a three-step process. In the synchronization DS, two correction values factor and offset are calculated by block 133. The correction values factor and offset are stored in block 134. Using these values, block 135 can calculate the slave system time SST from the current monotone time tM according to 'SST=factor*tM+offset'.

The blocks represent functions that may be implemented by hardware and/or software. The three-step method of the slave system clock 130 comprises the following steps:

Step 1: Transmission of the synchronization command SYNC to the bus 500;
Step 2: Service Synchronization DS
Step 3: Calculation of the system time SST Block 133 is activated and calculated by the service synchronization DS:

a) the current drift from the current time differences $\Delta t_R/\Delta t_S$. After a positive plausibility check of the current drift, this is used to calculate the mean drift. A rough setting step of the master system clock 930 is not included.

b) the factor and the offset for the block 134 from $t_R$, $t_S$, $\overline{t_{ErrMS}}$, $\overline{t_{ErrSS}}$, and the mean drift between the clocks Prerequisite for the service synchronization DS is a successfully implemented synchronization command SYNC on the bus 500 and therefore new values $t_R$ and $t_S$. After a positive completion of the synchronization, the time $t_S$ is stored in block 137. The block 137 contains a validity, i.e., a timestamp, the synchronization signal time $t_S$ from which the correction values in block 134 originate. That is, after successfully executing the service synchronization DS in block 133. Block 138 calculates the state of bits S and $S_{RQ}$ from the current monotone time $t_M$ using the validity of the timestamp from block 137.

With the values factor and offset calculated in the synchronization in the second step in block 134, the system time SST in block 135 can be calculated by the slave system clock 130 on request using the monotone time $t_M$ in the third step.

The slave system clock 130 in the slave 100 has, among other things, a monotone clock 131. The monotone clock 131 starts with any time value (usually zero) and operates unaffected from the outside. It is a high-resolution time that counts monotonously since the last reboot and is therefore suitable for high-precision time difference measurements. In the exemplary embodiment of FIG. 3, the monotone clock 131 is formed by a timer which generates a clock, for example, by means of a quartz oscillator or another oscillator. The clock is used for example to clock the microcontroller 120. The monotone clock 131 starts after booting the slave 100—see FIG. 2—for example, with a value of zero, and increments the value $t_M$. In the embodiment of FIG. 3, the monotone clock 131 does not run synchronously with the master system time MST. Only after successful synchronization with the master system clock as a reference clock— e.g., by means of the previously explained three-step method—the slave 100 receives its valid slave system time SST at the output 139 of the system clock 130.

The state of the synchronization is transmitted for example by the bits synchronous S and synchronization request $S_{RQ}$ by the slave system clock 130 to the master 900 in the status byte of the slave process image. As long as the slave system time SST is not synchronized with the master system time MST in master 900, the bit synchronous S is not set in the status byte. The setting of the bit synchronization request $S_{RQ}$ in the status byte of the slave process image causes a software part in the master 900 to start the synchronization process.

In the slave system clock 130, the correct slave system time SST is calculated from a current time value $t_M$ of the monotone clock 131 and a synchronization signal time $t_S$ and the synchronization time $t_R$ in a synchronization block 133. The calculation can be made, for example, using the simplified equation (2):

$$SST = \text{factor} * t_M + \text{offset} \qquad (2)$$

Accordingly, the slave system time SST is calculated from the current time value $t_M$ of the monotone clock 131 and the two correction values factor and offset.

In the slave system clock 130, the time value which is captured by the determination of the synchronization command SYNC is referred to as the synchronization signal time $t_S$. With the synchronization command SYNC on the bus 500 received by the slave 100 and the output of the interrupt signal IRQ at the output 115, this interrupt signal IRQ arrives at the slave system clock 130. Based on the interrupt signal IRQ, the current time value $t_M$ of the monotone clock 131 is loaded into a time register 132. The synchronization time $t_R$ is loaded into another reference time register 136.

The slave system time SST in the slave system clock 130 is calculated without slope compensation from the monotone time $t_M$ according to the equation:

$$SST = (t_M - t_S) + (t_R - t_{Korr}) \qquad (3)$$

The correction time $t_{Korr}$ in the equation (4) is calculated according to equation (3):

$$t_{Korr} = \overline{t_{ErrMS}} - \overline{t_{ErrSS}} \qquad (4)$$

wherein $\overline{t_{ErrMS}}$ is the mean synchronization error of the master 900 and $\overline{t_{ErrSS}}$ is the mean synchronization error of the slave 100, 200. The two synchronization errors $\overline{t_{ErrMS}}$, $\overline{t_{ErrSS}}$ are measured repeatedly in the master 900 and slave 100, 200 and are stored in the bus components. The mean synchronization error $\overline{t_{ErrMS}}$ of the master 900 is the time between completion of the synchronization command, so for example, the last clock edge of the command transmission, and the capture of the synchronization time $t_R$. The mean synchronization error $\overline{t_{ErrSS}}$ of the slave 100, 200 is the time between the completion of the synchronization command and the capture of the synchronization signal time $t_S$.

If, for example, a slave system clock 130 according to the exemplary embodiment of FIG. 3 is used, a compensation of the drift between the master system clock 930 and the slave system clock 130 can also be carried out to improve the accuracy of the slave system clock 130. In one embodiment with compensation, the slave 100 is configured to receive a first synchronization command SYNC and a second synchronization command SYNC, wherein the second synchronization command SYNC follows the first synchronization command SYNC. Synchronization signal time $t_S$ and synchronization time $t_R$ are different for the first and second synchronization command SYNC.

The slave 100 is set up to at least partially compensate a drift error of the slave system clock 130 relative to the master system clock 930 based on a ratio of the time differences $\Delta t_R/\Delta t_S$ between receipt of a first synchronization command SYNC and a second synchronization command SYNC. The simplified equation 'SST=factor*$t_M$+offset' can be used for this. The factor 1) should stabilize at a relatively constant value. It compensates the drift of the clocks between two synchronizations. The offset should change with every synchronization. It compensates for the absolute error after each synchronization. The compensation can be done, for example, when reading out the slave system time SST, in the third step.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A bus system comprising:
   a plurality of bus components connected in an order in a bus for a ring-shaped transmission, the bus being configured to transmit process data serially through all bus components in the order;
   a master embodied as one of the bus components; and
   at least one slave embodied as one of the bus components,
   wherein the master has a master system clock for a master system time,
   wherein the slave has a slave system clock for a slave system time to be synchronized with the master system time,
   wherein the slave has a shift register that is connected in series with the bus components for transmission of the process data via the bus,
   wherein the slave comprises a command circuit and a switching device, the command circuit being adapted to receive at least one synchronization command, and the switching device being connected to receive the synchronization command such that the bus components embodied as slaves are connected in parallel for the reception of the synchronization command,
   wherein the master is configured to send the synchronization command via the bus at a synchronization time for parallel reception by the bus components embodied as slaves,
   wherein the master is configured to determine the synchronization time,
   wherein the command circuit of the slave is configured to output an interrupt signal to the slave system clock upon receipt of the synchronization command,
   wherein the slave system clock of the slave has a monotone clock and is adapted to record a time value of the monotone clock at a time of output of the interruption signal as the synchronization signal time,
   wherein the master is adapted to send the captured synchronization time via a data transmission to the bus,
   wherein the slave is adapted to receive the data transmission via the shift register, the shift register being connected in series with the bus components for the transmission of the data transmission to the bus, and
   wherein the slave system clock of the slave is configured to calculate and output the slave system time based on the synchronization time received by the data transmission and the synchronization signal time and the current time value of the monotone clock.

2. The bus system according to claim 1, wherein the slave is connected to a data line of the bus, wherein the command circuit of the slave is connectable to and disconnectable from the data line via the switching device.

3. The bus system according to claim 2, wherein the data line of the bus is connected to each bus component for the parallel reception of the synchronization command by the bus components embodied as slaves.

4. The bus system according to claim 1, wherein the command circuit has a register for the at least temporary storage of the synchronization command.

5. The bus system according to claim 1, wherein the switching device is connected to the register or to the shift register.

6. The bus system according to claim 1, wherein the master has a wired and/or wireless connection to a time server and/or a time signal generator, and wherein the time server and/or the time signal generator is formed inside or outside the automation system.

7. The bus system according to claim 1, wherein the switching device comprises a semiconductor switch, a gate or other logic element for switching.

8. The bus system according to claim 1, wherein the command circuit has an evaluation circuit, in which the evaluation circuit is configured to determine a number of different commands, and wherein the evaluation circuit is arranged to output the interrupt signal when the synchronization command is detected.

9. The bus system according to claim 1, wherein the evaluation circuit has a digital logic for detection, and wherein the evaluation circuit has an output connected to the digital logic for outputting the interrupt signal.

10. The bus system according to claim 1, wherein the bus comprises a control line, in which the slave is configured to receive the synchronization command based on a control signal on the control line, and wherein the control line is connected to the bus components.

11. The bus system according to claim 1, wherein the slave comprises a microcontroller, in which the slave system clock is part of the microcontroller, and wherein the microcontroller has a pause capable input for an input of the emitted interrupt signal.

12. The bus system according to claim 1, wherein the slave is configured to receive a first synchronization command and a second synchronization command, wherein the second synchronization command follows the first synchronization command, and wherein the slave is configured to at least partially compensate a drift error of the slave system clock with respect to the master system clock based on a time difference between the reception of the first synchronization command and the second synchronization command.

13. A method for synchronizing a slave system time to a master system time in a bus system having a plurality of bus components, wherein the bus components are connected in an order in a bus for ring-shaped transmission, wherein a master embodied as one of the bus components has a master system clock for the master system time, and wherein at least one slave embodied as one of the bus components has a slave system clock for the slave system time, the method comprising:

- transmitting the process data serially through all bus components in the order in the bus, wherein a shift register of the slave is connected in series with the bus components for the transmission of process data via the bus;
- receiving at least one synchronization command by a command circuit of the slave;
- switching a switching device of the slave for receiving the synchronization command such that bus components embodied as slaves are connected in parallel for receiving the synchronization command;
- transmitting the synchronization command for a parallel reception by the bus components embodied as slaves via the bus at a synchronization time point by the master;
- outputting an interrupt signal to the slave system clock upon receipt of the synchronization command via the command circuit of the slave;
- recording a time value of a monotone clock of the slave system clock at a time the interruption signal is output as the synchronization signal time via the slave system clock of the slave;
- determining the synchronization time by the master;
- transmitting the determined synchronization time via data transmission to the bus by the master;
- receiving the data transmission via the shift register by the slave, wherein the shift register is connected in series with the bus components for sending the data transmission via the bus;
- calculating the slave system time by the slave system clock based on the synchronization timing received via the data transmission and the synchronization time and the current time value of the monotone clock; and
- outputting the slave system time by the slave system clock.

* * * * *